US011935734B2

(12) United States Patent
Aliman et al.

(10) Patent No.: US 11,935,734 B2
(45) Date of Patent: Mar. 19, 2024

(54) ION TRAP WITH RING-SHAPED ION STORAGE CELL AND MASS SPECTROMETER

(71) Applicant: Leybold GmbH, Cologne (DE)

(72) Inventors: Michel Aliman, Oberkochen (DE); Yessica Brachthauser, Oberkochen (DE); Alexander Laue, Oberkochen (DE); Anthony Hin Yiu Chung, Oberkochen (DE)

(73) Assignee: Leybold GmbH, Cologne (DE)

( * ) Notice: Subject to any disclaimer, the term of this patent is extended or adjusted under 35 U.S.C. 154(b) by 17 days.

(21) Appl. No.: 17/765,690

(22) PCT Filed: Sep. 30, 2020

(86) PCT No.: PCT/EP2020/077433

§ 371 (c)(1),
(2) Date: Mar. 31, 2022

(87) PCT Pub. No.: WO2021/064060

PCT Pub. Date: Apr. 8, 2021

(65) Prior Publication Data

US 2022/0367168 A1 Nov. 17, 2022

(30) Foreign Application Priority Data

Oct. 1, 2019 (DE) ..................... 10 2019 215 148.5

(51) Int. Cl.
*H01J 49/42* (2006.01)

(52) U.S. Cl.
CPC .................................. *H01J 49/424* (2013.01)

(58) Field of Classification Search
CPC ..................................................... H01J 49/424
(Continued)

(56) References Cited

U.S. PATENT DOCUMENTS

| | | | |
|---|---|---|---|
| 5,625,186 | A | 4/1997 | Frankevich et al. |
| 6,891,157 | B2 | 5/2005 | Bateman et al. |

(Continued)

FOREIGN PATENT DOCUMENTS

| | | | |
|---|---|---|---|
| CN | 104900474 | A | 9/2015 |
| DE | 69502662 | T2 | 12/1998 |

OTHER PUBLICATIONS

Aliman et al., A novel electric ion resonance cell design with high signal-to-noise ratio and low distortion for Fourier transformation mass spectrometry, Journal of American Society for Mass Spectrometry, vol. 10, pp. 1000-1007, 1999.

(Continued)

*Primary Examiner* — Nicole M Ippolito
(74) *Attorney, Agent, or Firm* — Theodore M. Magee; Westman, Champlin & Koehler, P.A.

(57) ABSTRACT

The invention concerns an ion trap, including a first ring-shaped end cap electrode and a second ring-shaped end cap electrode, between which is formed a ring-shaped ion storage cell, as well as a plurality of radially inner disk-shaped ring electrodes and a plurality of radially outer disk-shaped ring electrodes, which delimit the ring-shaped ion storage cell. The invention also relates to a mass spectrometer that has such an ion trap as well as a control device that is designed to actuate the disk-shaped ring electrodes and the end cap electrodes for the storage, selection, excitation and/or detection of ions in the ring-shaped ion storage cell.

12 Claims, 1 Drawing Sheet

(58) Field of Classification Search
USPC .......................................... 250/281, 282, 283
See application file for complete search history.

(56) References Cited

U.S. PATENT DOCUMENTS

| | | | | |
|---|---|---|---|---|
| 9,035,245 | B2 | 5/2015 | Glasmachers et al. | |
| 10,141,174 | B2 | 11/2018 | Aliman et al. | |
| 2004/0079880 | A1 | 4/2004 | Bateman et al. | |
| 2013/0214152 | A1 | 8/2013 | Austin et al. | |
| 2015/0303047 | A1* | 10/2015 | Jiang .................. | H01J 49/4285 250/293 |
| 2016/0042935 | A1 | 2/2016 | Giles et al. | |

OTHER PUBLICATIONS

German Office Action date Jun. 5, 2020 for corresponding German application Serial No. 10 2019 215 148.5, 9 pages.

Grossmann et al., Harmonic inversion of semiclassical short time signals, Chemical Physics Letters vol. 279, pp. 355-360, 1997.

Notification of Transmittal of the International Search Report and the Written Opinion of the International Searching Authority, or the Declaration dated Jan. 13, 2021 and International Search Report dated Jan. 13, 2021 for corresponding PCT application Serial No. PCT/EP2020/077433, 6 pages.

Ji et al., A segmented ring, cylindrical ion trap source for time-of-flight mass spectrometry, Journal of the American Society for Mass Spectrometry, vol. 7, pp. 1009-1017, 1996.

Kotana et al., Computation of Mathieu stability plot for an arbitrary toroidal ion trap mass analyser, International Journal of Mass Spectrometry, vol. 414, pp. 13-22, 2017.

Lammert et al., Design, optimization and initial performance of a toroidal rf ion trap mass spectrometer, International Journal of Mass Spectrometry, vol. 212, pp. 25-40, 2001.

PCT Written Opinion dated Jan. 13, 2021 for corresponding PCT application Serial No. PCT/EP2020/077433, 7 pages.

* cited by examiner

ION TRAP WITH RING-SHAPED ION STORAGE CELL AND MASS SPECTROMETER

CROSS-REFERENCE OF RELATED APPLICATION

This application is a Section 371 National Stage Application of International Application No. PCT/EP2020/077433, filed Sep. 30, 2020, and published as WO 2021/064060 A1 on Apr. 8, 2021, the content of which is hereby incorporated by reference in its entirety and which claims priority of German Application No. 10 2019 215 148.5, filed Oct. 1, 2019.

BACKGROUND

The invention relates to a (Fourier transform) ion trap, comprising: a first ring-shaped end cap electrode and a second ring-shaped end cap electrode, between which is formed a ring-shaped ion storage cell. The ion trap is thus a circular or toroidal ion trap. The invention also relates to a mass spectrometer with such an ion trap.

The U.S. Pat. No. 9,035,245 B2 describes a mass spectrometer with an electrical FT ion trap. The FT ion trap has a ring electrode and two end cap electrodes with, respectively, hyperbolic geometry, between which is formed a non-ring-shaped ion storage cell that is delimited by the hyperbolic electrodes. As a rule, the two end cap electrodes are connected to virtual ground potential, whilst an HF storage signal in the form of a high-frequency alternating current is applied to the ring electrode.

Through the HF storage signal, an electrical field (quadrupole field) is created in the ion trap, which enables it to store ions or charged particles in a stable manner in the ion trap.

As an alternative to an ion trap with the geometry of a hyperbolic quadrupole or Paul trap, in the article "A novel electric ion resonance cell design with high signal-to-noise ratio and low distortion for Fourier transform mass spectrometry" by M. Aliman and A. Glasmachers, in the Journal of the American Society for Mass Spectrometry, vol. 10, no. 10, October 1999, a different geometry is proposed: the ring electrode is replaced by a cylinder of disk-shaped ring electrodes which extends in the axial direction from the first to the second end cap electrode. The ring electrodes are arranged equidistant in the axial direction. The resulting ion storage cell forms a cylinder with a hyperbolic base and a hyperbolic cap. With the aid of this ion trap, it is possible to reduce crosstalk currents which occur between the end cap electrodes and the ring electrode in the case of a conventional Paul trap.

In a three-dimensional FT ion trap, many functions can be carried out in situ, e.g. ion selection or ion filtering, ion storage, ion excitation and ion detection. From U.S. Pat. No. 10,141,174 B2, the practice is known of carrying out in such an FT ion trap, in the creation and storage of ions and/or in the excitation of ions before the detection of the ions, at least one selective IFT ("Inverse Fourier Transform") excitation depending on the mass-to-charge ratio of the ions, in particular a SWIFT ("Stored Wave Form Inverse Fourier Transform") excitation. Selective SWIFT excitation can, in particular, be used for the selection of ions or for ion filtering. For the separation of the ion populations stored in the FT ion trap, wavelet and/or FFT techniques can be used. In the detection of ions, noise-detection techniques can be used.

For the detection of ions, measurement signals produced at the end cap electrodes can be used which are produced by mirror charges. In a mass spectrometer, mass spectra can be rapidly calculated from the measurement signals with the aid of Fast Fourier Transform (FFT) or with the aid of methods such as harmonic inversion, cf. e.g. "Harmonic inversion of semiclassical short time signals", F. Grossmann et al., Chem. Phys. Lett. 279 (1997) 355-360. The sensitivity of ion trap mass spectrometers is also high. These performance features are necessary in many applications, for example in order to detect an end point quickly and precisely from the gas composition in a semiconductor process (so-called End Point Detection application).

In the case of an FT ion trap too, however, there are some challenges to be overcome during the measurement procedure. These relate for example to the maximum ionic charge of the ion trap and/or the ratio of the storable majority charge carriers to the minority charge carriers and the selectivity during ion filtration or ion production, the filter characteristic of the ion trap itself, as well as the separation and detection of the ion species of interest.

The characteristics of such a compact mass spectrometer or such an ion trap can be severely impaired and limited by too great an ionic charge. For example, low ion concentrations of e.g. 100 ppb cannot be demonstrated unless ion filtration of a background gas, e.g. nitrogen, takes place. This measurement impairment in the ion trap is attributable to the so-called space charge problem: in the detection of ions in the (electrical) FT ion trap, it is presupposed that the high-frequency alternating field E alone acts on the ions. In practice, this applies as long as there is only a limited quantity of charge carriers of the same sign in the FT ion trap.

The total number of charge carriers is referred to as the "space charge" or "ion cloud". The potential $\phi$ ($E=-\text{grad}(\phi)$) that can be described via the Laplace equation and is derived from the high-frequency alternating field E is influenced by the space charge. This influencing of the storage potential $\phi$ by the space charge in a given volume within the FT ion trap is greater, the greater the space charge density $\rho$ (in $As/m^3$) in this volume and the weaker the mean restoring force in the corresponding part-volume originating from the high-frequency alternating field. From the Laplace equation for the high-frequency alternating field, it follows:

$$\text{div}(\text{grad}(\phi)=\Delta\phi=-\rho/\varepsilon_o\neq 0, \quad (1)$$

where $\varepsilon_o$ represents the dielectric constant in the vacuum and $\phi$ represents the high-frequency alternating potential belonging to the alternating field E (see above). A large space charge can lead to a massive loss of ions and/or to the suppression of the measurement signals of small ion populations. To solve the problem of space charge, in DE 10 2015 208 188 A1 it is proposed that ion packets are spatially pulled apart with the aid of suitable SWIFT excitations.

Another possibility for solving the space charge problem lies in enlarging the ion storage cell that is available for storing the ions. To this end, so-called toroidal ion traps are used, cf. for example the article "Design, optimization and initial performance of a toroidal rf ion trap mass spectrometer", S. A. Lammert et al., International Journal of Mass Spectroscopy, 212 (2002) 25-40. In such ion traps, however, there is the problem that non-linear field sections prevent the mass resolution or sensitivity in the conduct of mass spectrometry. In the article cited, it is proposed to use an asymmetrical design of the toroidal ion trap in order to increase the mass resolution, cf. also the poster "Toroidal Multipole Expansion for the Design of Circular Ion Traps", Lammert et al., $62^{nd}$ ASMS Conference, Baltimore, Maryland, 15-19 Jun. 2014.

The stability of the ion trajectories in a toroidal ion trap is examined in the article "Computation of Mathieu stability plot for an arbitrary toroidal ion trap mass spectrometer", Appala Naidu Kotana et al., International Journal of Mass Spectrometry 414 (2017) 13-22.

SUMMARY

The task of the invention is to provide an ion trap and a mass spectrometer with such an ion trap, which enable both a high ion charge and high sensitivity in the detection of ions.

OBJECT OF THE INVENTION

This object is achieved by an ion trap of the type mentioned at the outset, which has a plurality of radially inner disk-shaped ring electrodes and a plurality of radially outer disk-shaped ring electrodes which delimit the ring-shaped ion storage cell. The ring-shaped ion storage cell is bounded on the inside in the radial direction by the inner disk-shaped and circular ring electrodes, and on the outside in the radial direction by the outer disk-shaped and circular ring electrodes. As a rule, the number of inner ring electrodes corresponds to the number of outer ring electrodes. The ion trap, or to put it more precisely, the two end cap electrodes and the ring electrodes, essentially run in rotational symmetry to a centrically arranged axis of symmetry of the ion trap. The two end cap electrodes delimit the (circular) ring-shaped ion storage cell in an axial direction. Therein, disk-shaped refers to a substantially flat shape, i.e. the inner disk-shaped electrodes and similar the outer disk-shaped ring electrodes have a radial extension exceeding the axial extension by a facto of more than two, preferably more than five and more preferred by a factor of more than 10.

In particular, each of the inner ring electrodes and also each of the outer ring electrodes are separated from each other to be able to apply a different potential to each of the ring electrodes.

Through the circular geometry of the ion trap, the ion storage cell can be enlarged considerably compared with conventional 3D ion traps in the form of Paul traps.

In this way, the maximum ion charge of the ion trap can be increased by more than a factor of 5, or more than a factor of 10, compared with a conventional Paul trap. The ion trap with the disk-shaped ring electrodes can furthermore be manufactured in a simple manner. The spatially circular storage of ions in the ring-shaped ion storage cell also makes it possible to solve the space charge problem by means of a suitable circular enlargement of the ion storage cell—and thus a significant reduction of the space charge density ρ—in an efficient manner. With appropriate driving of the ion trap that is designed as described above, at the same time the non-linear field sections in the ion storage cell can be suppressed and thus a high mass resolution or sensitivity of the ion trap can be achieved.

In the case of one embodiment, the inner ring electrodes and the outer ring electrodes are arranged at a constant radial distance from one another. The ion storage cell thus runs in a radial direction between a minimum radius that is determined by the radially outer end faces of the inner ring electrodes and a maximum radius that is determined by the radially inner end faces of the outer ring electrodes. In this way, ions circulate in the "cold, cooled" state in the ion trap on an orbit whose radius lies in the middle between the maximum radius and the minimum radius of the ion storage cell. Therein, the inner ring electrode and the outer ring electrode are separated by the ion storage cell.

In the case of a further embodiment, a radial distance between the inner ring electrodes and the outer ring electrodes is smaller than a radius of the ring-shaped end cap electrodes. The ring-shaped end cap electrodes typically have a hyperbolic geometry. The radius of the end cap electrodes is understood to be the mean value between the maximum and minimum extensions of the end cap electrodes in the radial direction.

This radius should correspond at least to the—generally constant—radial distance between the inner ring electrodes and the outer ring electrodes.

In the case of a further embodiment, in each case an inner ring electrode and an outer ring electrode are arranged on a common plane perpendicular to the axial direction. The planes in which the respective pairs of ring electrodes are arranged are aligned in parallel and arranged over one another, spaced apart from one another in an axial direction.

In the case of one embodiment, in each case an inner ring electrode and an outer ring electrode, i.e. a pair of ring electrodes, are connected to one another in an electrically conductive manner. The ring electrodes that are connected in an electrically conductive manner to one another have the same electrical potential. A respective pair of ring electrodes is preferably arranged in the common plane described above.

In the case of a further embodiment, the following applies for a width b of a respective first or second ring electrode in the radial direction and a distance d in the axial direction between, respectively, two adjacent first or second ring electrodes: $d/b<1/4$. The distance d between the adjacent ring electrodes can for example be between approx. 100 μm and approx. 1 mm. The width b in the radial direction accordingly lies between approx. 400 μm and 4 mm. Through the open mechanical architecture of the ion trap (as far as possible, no "enclosed" spaces), on account of the disk-shaped ring electrodes spaced apart from one another ("discrete"), to produce the potential wells for the ions, a higher vacuum conductivity of the ion trap compared to conventional ion traps with solid ring electrodes can be ensured.

In the case of a further embodiment, the ion trap has a number N of radially inner ring electrodes and a number N of radially outer ring electrodes, for which the following applies: $10<N<200$.

It has been shown that even a comparatively small number N of ring electrodes is sufficient to allow ions to circulate in the "cold, cooled" state on stable orbits in the ion storage cell.

In the case of a further embodiment, the first end cap electrode and/or the second end cap electrode is/are divided into at least two ring-shaped segments in the circumferential direction. The two or more segments typically extend in the circumferential direction over the same angle interval: if a respective end cap electrode is divided into two segments in the circumferential direction, both segments extend in the circumferential direction over an angle of approx. 180° and are electrically isolated from one another by a gap. Accordingly, three segments extend in each case over approx. 120°, four segments in each case over approx. 90° in the circumferential direction, etc. In the event that both end cap electrodes are segmented, the segments typically extend over the same angle range in the circumferential direction. On account of the segmentation, in time-multiplexing operation the end cap electrodes can optionally be used as excitation or detection or measurement electrodes. In this way, all customary Fourier transform measurement tools can be used in the case of the ion trap such as are used in a conventional FT ion trap (for example, ion filtration during ionisation or storage, separation of the ions and non-destructive detection).

In the case of a further embodiment, the ion trap additionally comprises an injection device for the preferably tangential, in particular pulsed injection of ions and/or an electron beam into the ring-shaped ion storage cell. The ions can be produced in an (external) ion source and introduced into the ring-shaped ion storage cell via the injection device. As a rule, injection of the ions takes place in a pulsed manner, i.e. via a pulsed supply, which for example can have a controllable valve.

The injection device can have an ion lens or the like in order to inject or shoot the ions on a straight trajectory into the ring-shaped ion storage cell, this lens being preferably oriented tangentially to the mean radius of the ring-shaped ion storage cell. The ions are preferably injected into the ring-shaped ion storage cell in an interspace between two outer ring electrodes that are spaced apart in an axial direction. Injection preferably takes place in a plane perpendicular to the axial direction, i.e. parallel to the ring electrodes.

The injection device can also serve to inject an electron beam into the ring-shaped ion storage cell, in order to produce ions directly in the ion trap, through impact ionisation. In this case, the gas that is to be analysed can be guided by means of the injection device into the ion storage cell before the ions are produced with the aid of the electron beam.

Another aspect of the invention relates to a mass spectrometer, comprising: an ion trap that is designed as described above, as well as an (electronic) control device that is designed to actuate the disk-shaped ring electrodes and the end cap electrodes of the ion trap for the storage, selection, excitation and/or detection of ions in the ring-shaped ion storage cell. The production of the HF storage field (see below) and of the necessary signals for the excitation, selection/separation and for the detection of the ions is realised with the aid of an electronic control device. To this end, the control device can comprise suitable hardware, e.g. electronic circuits, and/or software. As a rule, the signals for excitation, selection and detection are applied to the end cap electrodes or are tapped at the end cap electrodes. It is however also possible that for excitation of the ions, the control device provides an excitation signal at the ring electrodes.

For the excitation, as described above, at least one selective SWIFT ("Stored Wave Form Inverse Fourier Transform") excitation depending on the mass-to-charge ratio of the ions can be carried out, or possibly a broad-band one.

In the case of one embodiment, the control device is arranged at least partially within a volume area that is surrounded by the ring-shaped ion storage cell. The control device is preferably arranged in the centre of the ion trap or of the ring-shaped ion storage cell. The control device can for example be arranged in a separate vacuum area which for example is separated from the ring-shaped ion storage cell by means of a seal, through differential pumping or by a housing. The control device is however not necessarily arranged in the centre of the ion trap; rather, it or the components of the ion trap that are needed for actuating the ion trap can also be arranged elsewhere in the vicinity of the ion trap.

In the case of a further embodiment, the control device is designed to actuate the disk-shaped ring electrodes to produce a respective HF storage voltage to store ions in the ion storage cell. To this end, an electrical HF potential that is produced by an HF generator can be divided over the individual ring electrodes in an appropriate manner. Preferably, each of the inner ring electrodes are at different potentials. Similar, each of the outer ring electrodes are at different potentials. Preferably, the respective inner and outer ring electrodes are on the same electrical potential, an electrical potential $V_{RF,i}(t)$, for example running quadratically to i, can be applied to the i-th ring electrode; starting out from an HF potential $V_{RF}(t)$, e.g. a harmonic potential $V_{RF}(t)=V_{max}\sin(\omega t)$, for example, this is defined as follows:

$$V_{RF,i}(t)=V_{RF}(t)(1-i^2/N^2) \quad (2)$$

where the following applies for i: $-N \le i \le N$, i.e. there is a total number of 2N+1 inner ring electrodes and 2N+1 outer ring electrodes available, which are arranged equidistant from one another in an axial direction (in the Z direction); cf. also the article by M. Aliman and A. Glasmachers cited at the outset.

It is understood that the ring electrodes need not necessarily be arranged equidistantly and that HF voltage $V_{RF,i}(t)$ applied to a respective pair of inner and outer ring electrodes need not necessarily be divided up according to equation (2). The application of the voltage to the respective ring electrode can take place with the aid of a matching network and a voltage divider network, which for example has parallel-switched resistors and capacitors, as described in the article by M. Aliman and A. Glasmachers cited at the outset, the entirety of which is incorporated into the content of this application by reference. With the aid of the HF storage field of the ring electrodes, it is possible to realise spatially circular ion storage, in which the ions move in the "cold, cooled" state along a circular orbit. Such an HF storage field has only comparatively small non-linear field sections, and therefore enables ion detection with high mass resolution.

In the case of one embodiment, the control device is designed, on the basis of ion signals recorded at different segments of the end cap electrodes, to determine a time-related dispersion of the ions that are injected in a pulsed manner into the ion storage cell. When the ions are injected in a pulsed manner, i.e. in the form of ion packets, into the ring-shaped ion storage cell—and thus initially excited—it can be determined on the basis of the recorded ion signals how the ion dispersion advances (more mobile ions advance more rapidly) with increasing storage time. It turns out to be advantageous here that a separate ion signal can be recorded at each segment of the end cap electrode(s).

In this way, it is possible for example to draw conclusions about the spatial distribution of the ion population and about pressure-dependant processes in the ion trap. In order to obtain conclusions about ion mobility, a time-limited cooling by a suitable braking gas (e.g. helium) can be introduced.

In the case of one embodiment, the control device is designed to deflect the electron beam that is injected tangentially into the ring-shaped ion storage cell along a circular trajectory. As has been described further above, for the flexible ion production and ion storage, at least one (pulsed) electron beam can be injected into the ion storage cell. Since, furthermore, the electrons (with elementary charge e; velocity $v_e$) are lighter than the ions that are to be detected by at least three to four orders of magnitude, it is possible to deflect the electron beam practically alone such that through the production of a sufficiently small, time-limited induction B it is moved on a circular orbit and, in doing so, runs through all the segments of the ring-shaped ion storage cell when the Lorentz force F acts on the electron beam, according to:

$$\vec{F}=e(\vec{v}_e\times\vec{B}) \quad (3)$$

By forcing the electron beam onto a circular path, particularly effective electron ionisation can be achieved, and the flexibility in the production, storage and injection of the ions can be increased.

Further features and advantages of the invention follow from the following description of example embodiments of the invention, on the basis of the figures of the drawing that show details that are essential to the invention, and from the claims. The individual features may be realised in each case individually or as a plurality in any desired combination in a variant of the invention.

The Summary is provided to introduce a selection of concepts in a simplified form that are further described in the Detail Description. This summary is not intended to identify key features or essential features of the claimed subject matter, nor is it intended to be used as an aid in determining the scope of the claimed subject matter.

BRIEF DESCRIPTION OF THE DRAWINGS

Example embodiments are shown in the schematic drawing and are explained in the following description. In the drawing.

DETAILED DESCRIPTION

In the following description of the drawings, identical reference numbers are used for components that are identical or have the same function.

Figure 1:
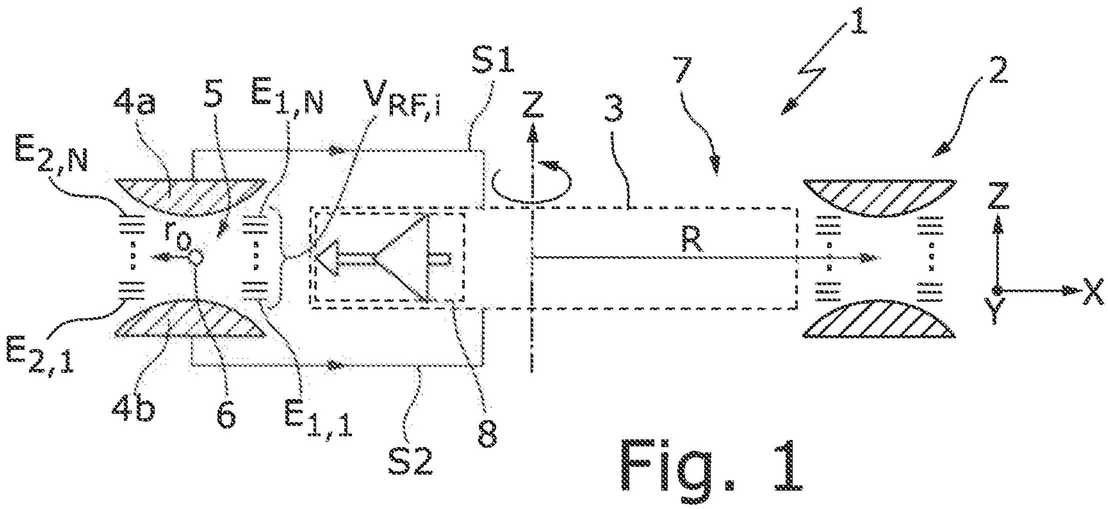
FIG. 1 shows a schematic representation of a cross-section of a mass spectrometer with an ion trap with a ring-shaped ion storage cell.

FIG. 1 shows a schematic cross-sectional view of a mass spectrometer 1, which has an ion trap 2 as well as an electronic control device 3. The ion trap 2 comprises a first ring-shaped end cap electrode 4*a* that is at the top in an axial direction Z of an XYZ coordinate system, and a second ring-shaped end cap electrode 4*b* that is at the bottom in an axial direction Z, between which is formed a ring-shaped ion storage cell 5. The two end cap electrodes 4*a*, 4*b* respectively have a hyperbolically curved surface facing the ion storage cell 5, as is customary in the case of an ion trap in the form of a Paul trap.

The ring-shaped ion storage cell 5 runs radially symmetrical to the axial direction Z of the XYZ coordinate system. In the sectional illustration of FIG. 1, the radial direction corresponds to the X direction of the XYZ coordinate system. In the radial direction X, the ion storage cell 5 is bounded to the inside by a plurality or number N of radially inner disk-shaped ring electrodes $E_{1,i}$ (i=1, . . . , N) and to the outside by a plurality or number N of radially outer disk-shaped ring electrodes $E_{2,i}$ (i=1, . . . , N). The plurality N of radially inner ring electrodes $E_{i}$; are arranged over one another in the axial direction Z. Accordingly, the plurality N of radially outer ring electrodes $E_{2,i}$ are also arranged over one another in the axial direction Z.

The ring-shaped ion storage cell 5 has a constant extension in the radial direction X, which corresponds to the distance 2 $r_0$ between the inner and outer ring electrodes $E_{1,i}$, $E_{2,i}$. The radial distance 2 $r_0$ between the inner and outer ring electrodes $E_{1,i}$, $E_{2,i}$ here is less than the radius R of the two end cap electrodes 4*a*, 4*b*. The radius R of the end cap electrodes 4*a*, 4*b*, which corresponds to the mean radius R of the ion storage cell 5, runs in the radial direction X centrally through the two end cap electrodes 4*a*, 4*b*.

The ion storage cell 5 runs in the radial direction X between a minimum radius $R-r_0$, which is determined by the radially outer end faces of the inner ring electrodes $E_{1,i}$, and a maximum radius $R+r_0$, which is determined by the radially inner end faces of the outer ring electrodes $E_{2,i}$. Through the constant distance 2 $r_0$ between the ring electrodes $E_{1,i}$, $E_{2,i}$, it is made possible for the ions 6 in the "cold, cooled" state to circulate in the ion trap 2 in an orbit that corresponds to the mean radius R of the ring-shaped ion storage cell 5.

In the example shown, the number N of inner ring electrodes $E_{1,i}$ corresponds to the number N of outer ring electrodes $E_{2,i}$.

For the quantity N, in the example shown the following applies: 10<N<200. It has been shown that even a comparatively small number N of ring electrodes $E_{1,i}$, $E_{2,i}$ is sufficient to allow the ions 6 in the "cold, cooled" state to circulate on stable orbits in the ring-shaped ion storage cell 5.

Figure 3:
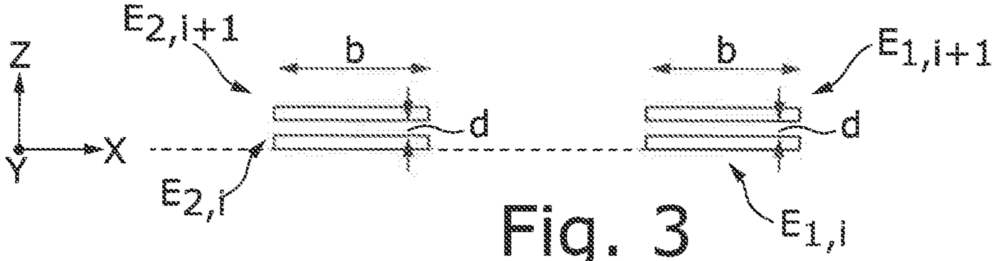
FIG. 3 shows a detailed representation of several outer and inner disk-shaped ring electrodes which radially delimit the storage cell.

As can be seen in FIG. 1 as well as in FIG. 3, the ring electrodes $E_{1,i}$, $E_{2,i}$ are arranged in pairs in common planes X, Y perpendicular to the axial direction Z. In each case two ring electrodes $E_{1,i}$, $E_{2,i}$ arranged in a common plane X, Y are connected to one another via an electrical lead or electrical contact, not shown in the drawing, i.e. they are on the same electrical potential. Electrical contact can also be effected via the control device 3. For the width b of a respective disk-shaped first ring electrode $E_{1,i}$ in the radial direction X and a distance d in an axial direction Z between, respectively, two adjacent first ring electrodes $E_{1,i}$, $E_{1,i+1}$, the following applies: d/b<¼. Accordingly, for the (identical) width b of the second ring electrodes $E_{2,i}$ and for a distance d in an axial direction Z between, respectively, two adjacent second ring electrodes $E_{2,i}$, $E_{2,i+1}$, the following likewise applies: d/b<¼.

The distance d between the adjacent ring electrodes $E_{1,i}$, $E_{1,i+1}$ or $E_{2,i}$, $E_{2,i+1}$ can for example be between approx. 100 μm and approx. 1 mm. The width b in the radial direction X is accordingly between approx. 400 μm and 4 mm. Through the open mechanical architecture of the ion trap 2 on account of the disk-shaped ring electrodes $E_{1,i}$, $E_{2,i}$ that are distanced from one another ("discrete"), to produce the potential wells for the ions 6, a higher vacuum conductivity of the ion trap 2 compared to conventional ion traps is ensured with a solid ring electrode.

Figure 2:
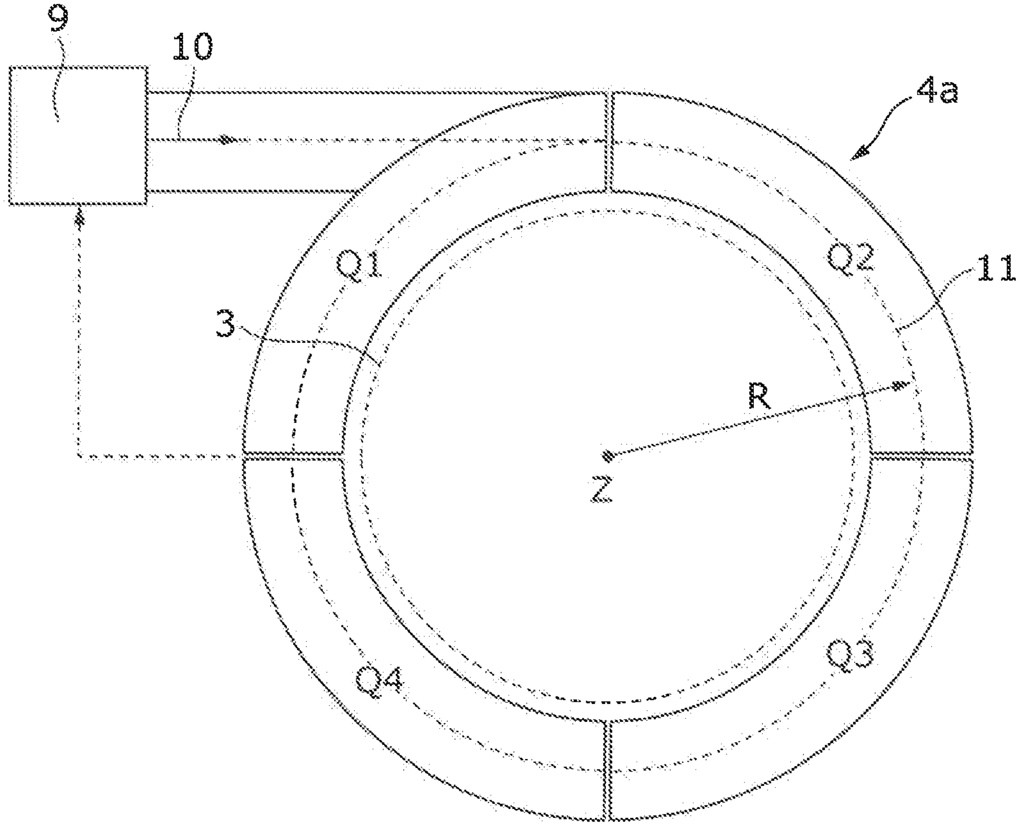
FIG. 2 shows a top view onto the ring-shaped ion storage cell of FIG. 1 with a segmented end cap electrode.

As can be seen in FIG. 2, the first end cap electrode 4*a* is divided, in the circumferential direction, into four ring-shaped segments Q1, Q2, Q3, Q4, which extend in the circumferential direction in each case over an angle of 90°.

Accordingly, the second end cap electrode 4*b* too is divided into four ring-shaped segments Q1, Q2, Q3, Q4 (not shown in the drawing). On account of the segmentation, in the time-multiplexing operation of the control device 3, the end cap electrodes 4*a*, 4*b* can be used optionally as excitation, filtration or measurement electrodes.

The control device 3 is in signal connection with each of the four segments Q1, Q2, Q3, Q4 of the first end cap electrode 4*a* and with each of the four segments Q1, Q2, Q3, Q4 of the second end cap electrode 4*b*, in order to transmit excitation signals and to receive ion signals or measurement signals. By way of an example, FIG. 1 shows two such measurement signals S1, S2, which are produced by mirror charges of the excited ions 6 stored in the ion storage cell 5 and which originate from a respective first segment Q1 of the first or second end cap electrode 4*a*, 4*b*. On the basis of these ion signals S1, S2, which are typically evaluated differentially, and on the basis of additional ion signals recorded at the second to fourth segments Q2, Q3, Q4, a time-related dispersion (more mobile ions advance faster) of the ions 6 injected in a pulsed manner into the ring-shaped ion storage cell 5 can be established.

In this way—but also possibly where non-segmented end cap electrodes 4*a*, 4*b* are used—in the case of the ion trap 2 all customary Fourier transform measurement tools can be applied such as are used in a conventional FT ion trap, for example ion filtration during ionisation or storage, separation of ions and non-destructive detection. In particular, in the ion trap 2 SWIFT excitations can also be carried out, for example in the manner described in U.S. Pat. No. 10,141,174 B4, the entirety of which is incorporated into the content of this application by reference.

As has been described further above, the control device 3 typically actuates the end cap electrodes 4*a*, 4*b* or the respective segments Q1, Q2, Q3, Q4 of the end cap electrodes 4*a*, 4*b* for the selection, excitation and detection of the ions 6 in the ion storage cell 5.

The control device 3 is also designed for storing the ions 6 in the ion storage cell 5. To this end, the control device 3 has an HF generator 8 as well as a resistance network in order to actuate the disk-shaped ring electrodes $E_{1,i}$, $E_{2,i}$ to produce a respective HF storage voltage $V_{RF,i}$ or to apply the corresponding HF storage voltage $V_{RF,i}$ to them. The splitting of a given e.g. harmonic HF storage voltage $V_{RF}(t) = V_{max} \sin (w\ t)$ over the individual ring electrodes $E_{1,i}$, $E_{2,i}$ or over the respective pairs of electrodes can for example take place in the manner described in the article by M. Aliman and A. Glasmachers cited above (in this case, or if equation (2) is used, the following applies for i: $-N/2<i<N/2$). It is understood that the splitting of the HF storage voltage $V_{RF}(t)$ over the respective HF storage voltages $V_{RF,i}$ of the individual ring electrodes $E_{1,i}$, $E_{2,i}$ can also take place in a manner other than that described here.

In the case of the example shown in FIG. 1 and FIG. 2, the control device 3 is arranged wholly within a volume area 7 that is surrounded by the ring-shaped ion storage cell 5. The control device 3 is arranged in the centre of the ion trap 2 or ring-shaped ion storage cell 5, and does not project beyond the ring-shaped ion storage cell 5 in the axial direction Z. The control device 3 can for example be arranged in a separate vacuum area, which for example is separated from the ring-shaped ion storage cell 5 by a seal, by differential pumping or by a housing. Through this arrangement of the control device 3, a particularly compact mass spectrometer 1 can be achieved.

The control device 3 is also designed to actuate an injection device 9 that is shown in FIG. 2, and which in the example shown, serves for the tangential, typically pulsed, injection of ions 6 into the ring-shaped ion storage cell 5. The injection device 9 can have a controllable, in particular pulsed inlet or inlet system, e.g. a controllable valve, in order to inject the ions 6 of the gas that is to be analysed, which are produced by an (external) ion source that is not shown in the drawing, into the mass spectrometer 1 or into the ring-shaped ion storage cell 5. To this end, the injection device 9 can have in particular an ion lens, not shown in the drawing, which injects the ions 6 into the ring-shaped ion storage cell 5 on a straight trajectory that is aligned tangentially to the mean radius R of the ring-shaped ion storage cell 5, as can be seen in FIG. 2.

In the example shown, the ions 6 are injected in a plane X,Y perpendicular to the axial direction Z and in an axial direction Z centrally between the end cap electrodes 4*a*, 4*b*, so that the ions 6 move in a non-excited state on a circular trajectory 11 in the middle of the ion storage cell 5.

In the example shown here, the distance d between the adjacent outer ring electrodes $E_{2,i}$, $E_{2,i+1}$ is chosen to be sufficiently large to inject the ions 6 between two adjacent ring electrodes $E_{2,i}$, $E_{2,i+1}$ into the ring-shaped ion storage cell 5, i.e. it is not necessary to provide an additional entrance for the injection of the 6 into the ring-shaped ion storage cell 5.

The mass spectrometer 1 and in particular the ring-shaped ion storage cell 5 are arranged in a housing, not shown in the drawing, which separates the mass spectrometer 1 from its surroundings, for example from a process chamber, with the gas that is to be analysed.

With the aid of vacuum pumps that are not shown in the drawing, a vacuum is produced in the ion trap 2 and in particular in the ion storage cell 5. Therefore apart from the ions 6 of the gas that is to be analysed, in the ion storage cell 5 there is only a background gas which typically has a very low pressure.

In the example shown here, the injection device 9 is designed, in addition to the injection of ions 6, for the production and injection of an electron beam 10 into the ring-shaped ion storage cell 5. The electron beam 10 too is supplied tangentially to the ion storage cell 5, as can be seen in FIG. 2. The control device 3 actuates the end cap electrodes 4*a*, 4*b*, in order to produce a Lorentz force on the electron beam 10 according to the above equation (3), and to deflect it onto a circular trajectory 11 in the ion storage cell 5. The electron beam 10 serves to produce ions 6 directly in the ion storage cell 5 through impact ionisation. The production of the ions 6 in the ion storage cell 5 can take place on a neutral gas that is to be analysed, which is supplied to the ion storage cell 5 via the injection device 9 or possibly via another entrance, before the ions 6 of the gas that is to be analysed are produced in situ in the ion storage cell 5 with the aid of the electron beam 10.

In summary, with the aid of the ring-shaped or circular ion trap 2 described above, the available ion storage cell 5 can be significantly enlarged without significant enlargement of the construction space of the ion trap 2. Through the electronic control device 3, it is also possible to force spatial, circular ion storage, in which the ions 6 move, pictorially, in a circular orbit. In this way, a circular enlargement of the ion storage cell 5 is achieved, the space charge problem is minimised, and thus the measurement resolution is increased as compared with conventional FT ion traps.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

The invention claimed is:

1. A mass spectrometer comprising:

an ion trap, comprising:

a first ring-shaped end cap electrode and a second ring-shaped end cap electrode, between which is formed a ring-shaped ion storage cell, characterised by a plurality of radially inner disk-shaped ring electrodes and a plurality of radially outer disk-shaped ring electrodes that delimit the ring-shaped ion storage cell; and a control device that is designed to actuate the disk-shaped ring electrodes and the end cap electrodes for the storage, selection, excitation and/or detection of ions in the ring-shaped ion storage cell, and, on the basis of ion signals recorded at different segments of the end cap electrodes, to determine a time-related dispersion of the ions that are injected in a pulsed manner into the ion storage cell.

2. The mass spectrometer according to claim 1, in which the inner ring electrodes and the outer ring electrodes are arranged at a constant radial distance from one another.

3. The mass spectrometer according to claim 1, in which a radial distance between the inner ring electrodes and the outer ring electrodes is smaller than a radius of the ring-shaped end cap electrodes.

4. The mass spectrometer according to claim 1, in which in each case an inner ring electrode and an outer ring electrode are arranged on a common plane perpendicular to an axial direction.

5. The mass spectrometer according to claim 1, in which in each case an inner ring electrode and an outer ring electrode are connected to one another in an electrically conductive manner.

6. The mass spectrometer according to claim 1, in which for a width b of a respective disk-shaped first or second ring electrode and a distance d in the axial direction between, respectively, two adjacent first or second ring electrodes, the following applies: $d/b<1/4$.

7. The mass spectrometer according to claim 1, which has a number N of radially inner ring electrodes and a number N of radially outer ring electrodes, for which the following applies: $10<N<200$.

8. The mass spectrometer according to claim 1, in which the first end cap electrode and/or the second end cap electrode are divided into at least two ring-shaped segments in the circumferential direction.

9. The mass spectrometer according to claim 1, further comprising:

at least one injection device for the preferably tangential, particularly pulsed, injection of ions and/or of an electron beam into the ring-shaped ion storage cell.

10. The mass spectrometer according to claim 1, in which the control device is arranged at least partially within a volume area that is surrounded by the ring-shaped ion storage cell.

11. The mass spectrometer according to claim 1, in which the control device is designed to actuate the disk-shaped ring electrodes to produce a respective HF storage voltage to store ions in the ion storage cell.

12. The mass spectrometer according to claim 1, in which the control device is designed to divert an electron beam injected tangentially into the ring-shaped ion storage cell along a circular trajectory.

* * * * *